Oct. 13, 1970  W. J. VAN DER BURG ET AL  3,534,041
POLYCYLIC PIPERAZINES

Filed March 1, 1967  2 Sheets-Sheet 1

INVENTORS
WILLEM JACOB VAN DER BURG
JACQUES DELOBELLE

BY  *Hugo E. Weisberger*
ATTORNEY

Oct. 13, 1970     W. J. VAN DER BURG ET AL     3,534,041
POLYCYLIC PIPERAZINES

Filed March 1, 1967     2 Sheets-Sheet 2

INVENTORS
WILLEM JACOB VAN DER BURG
JACQUES DELOBELLE

BY Hugo E. Weinberger
ATTORNEY

United States Patent Office 3,534,041
Patented Oct. 13, 1970

3,534,041
POLYCYCLIC PIPERAZINES
Willem Jacob van der Burg, Oss, Netherlands, and Jacques Delobelle, Gisors, France, assignors to Organon Inc., West Orange, N.J., a corporation of New Jersey
Filed Mar. 1, 1967, Ser. No. 619,867
Claims priority, application Netherlands, Mar. 12, 1966, 6603256
Int. Cl. C07d *51/70*
U.S. Cl. 260—268                                4 Claims

ABSTRACT OF THE DISCLOSURE

The invention relates to novel piperazine derivatives of the general formula

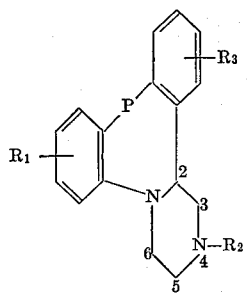

Figure 1:
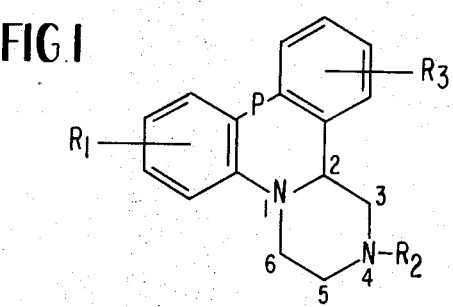
Figure 2:
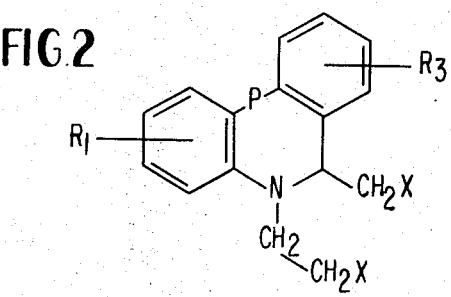
Figure 3:
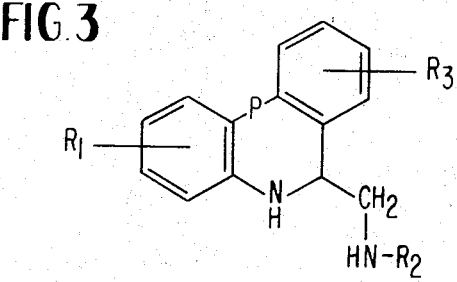
Figure 4:
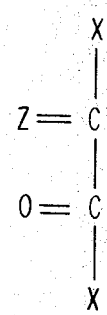
Figure 5:
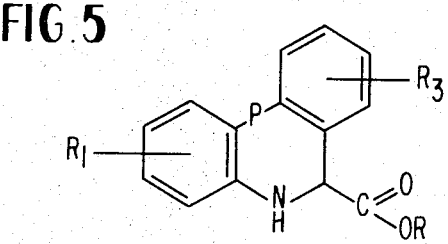
Figure 6:
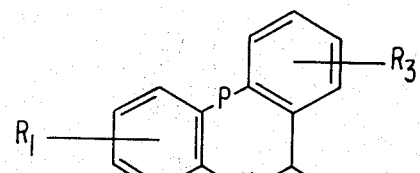
Figure 10:
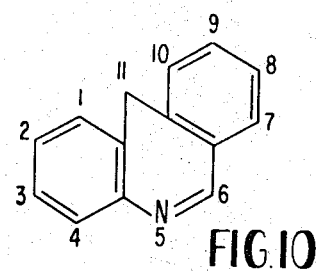
Figure 7:
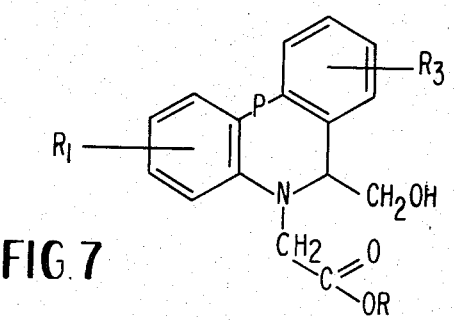
Figure 11:
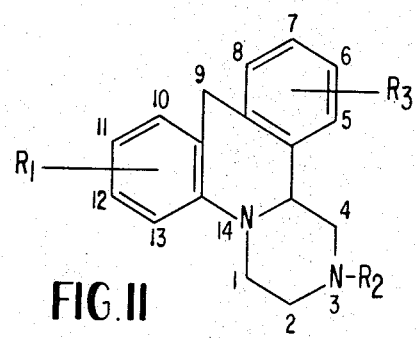
Figure 8:
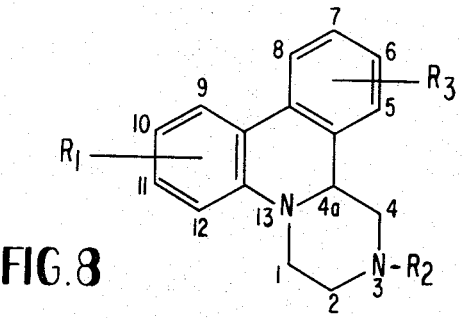
Figure 12:
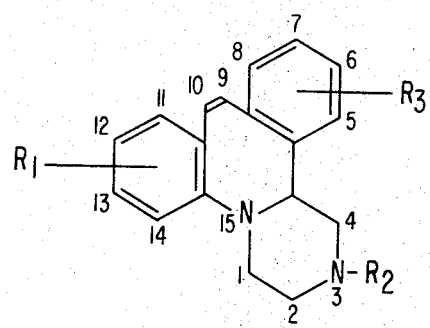
Figure 9:
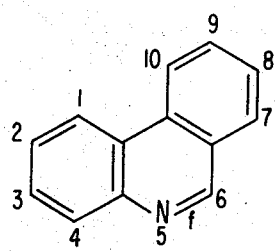

in which $R_1$ and $R_3$ represent hydrogen, halogen, a hydroxy, a lower organic acyloxy, alkyl or alkoxy group or a trifluoromethyl group, and $R_2$ hydrogen, a lower alkyl or aralkyl group, an aminoethyl or aminopropyl group substituted in N by lower alkyl groups, or a lower alkyl group with a nitrogen containing heterocyclic ring, and P a single bond, or a methylene, ethylene or ethylidene group. Further the invention comprises the process for the manufacture of the new compounds by reducing the keto group(s) occurring in at least one of the positions 3,5 and 6 of the piperazine ring of the corresponding compounds. Finally the invention comprises the intermediates and their preparation.

BACKGROUND OF THE INVENTION

There are already known several biologically active derivatives of piperazine. Thus U.S. Pat. No. 2,794,804 describes piperazines substituted at both nitrogen atoms and in the ring by a lower alkyl or hydroxyalkyl group. These compounds possess an oral vasodilating activity and exert an inhibiting action on adrenergic effects.

SUMMARY OF THE INVENTION

The object of the present invention consists of the derivatives of piperazine according to general Formula I in which $R_1$, $R_2$, $R_3$ and P have the meaning indicated above. Another object of the invention is the process for the manufacture of the said compounds comprising the reduction of the keto groups occurring in at least one of the positions 3, 5 and 6 of the piperazine ring of the corresponding compounds. A further object of the invention is the manufacture of said starting compounds containing a keto group and the intermediates of these syntheses.

The invention relates to novel piperazine derivatives of the general Formula I, see accompanying drawings, in which $R_1$ and $R_3$ represent hydrogen, halogen, a hydroxy, a lower acyloxy, alkyl or alkoxy group or a trifluoromethyl group, and $R_2$ hydrogen, a lower alkyl or aralkyl group, an aminoethyl or aminopropyl group substituted in N by lower alkyl groups, or a lower alkyl group with a nitrogen containing heterocyclic ring, and P a single bond, or a methylene, ethylene or ethenylene group.

Several biologically active derivatives of piperazine are already known. Thus U.S. Pat. No. 2,794,804 describes piperazines substituted at both nitrogen atoms and in the ring by a lower alkyl or hydroxyalkyl group. These compounds possess an oral vasodilating activity and exert an inhibiting action on adrenergic effects. U.S. Pat. No. 3,037,983 describes many other derivatives in which the two nitrogen atoms are substituted and in which a methyl group occurs in the nucleus, in α-position relating to the nitrogen atoms. This patent states that these compounds have a dilating activity on the bronchi and are usable in the treatment of asthma.

It has now been found that the compounds of the invention can be prepared quite easily by any method known for the synthesis of such compounds.

Further it has been found that the present compounds can be prepared most advantageously by reducing a corresponding compound, in which one or more keto groups are in positions 3, 5 and 6 of the piperazine ring in Formula I.

The compounds according to the invention exert an anti-inflammatory, antiserotoninic and antihistaminic, as well as a strong antiphlogistic activity. They also have a favourable effect in cardiovascular diseases. The free diamines according to Formula III, which are intermediates in the present preparation methods, exert a sedative, tranquilizing and antidepressive activity.

The compounds in which the 2 aromatic six-membered rings are connected are called 2,3,4,4a - tetrahydro-1H-pyrazino-(1,2-f)-phenanthridines and bear the numbers of Formula VIII. The starting products thereof bear the numbers of phenanthridine, see Formula IX. If P represents a —$CH_2$— group the final products are 2,3,4,4a-tetrahydro - 1H-pyrazino-(1,2-f)-morphanthridines numbered in accordance with Formula XI. The starting products are morphanthridines according to Formula X. If P represents a —$CH_2$—$CH_2$— or —CH=CH— group the final products are called 2,3,4,4a-tetrahydro- and 2,3,4,4a,9,10 - hexahydro-1H-dibenzo-(c,g)-pyrazino(1,2-a)-azocines, see Formula XII; the starting products are called dibenzo-(c,g)-azocines. The nomenclature used is the one of "The Ring Index" of "The American Chemical Society." By a lower alkyl group is meant an alkyl group with 1–6 carbon atoms, whether branched or not. A lower alkoxy group as e.g. indicated by $R_1$ and $R_3$ is an ether group derived from a lower aliphatic alcohol with 1–6 carbon atoms and a lower acyloxy group is an ester group derived from a lower aliphatic carboxylic acid with 1–6 carbon atoms.

The above reduction of the keto-substituted piperazine derivatives is preferably performed with an alkali metal aluminium hydride, for example $LiAlH_4$ or with diboran, or with a mixture of the latter reducing agents, or with diisobutyl aluminium hydride. It is also possible to apply catalytic hydrogenation with, for instance, Raney nickel or Adams platinum catalyst.

The said starting substances can be prepared by methods known for analogous compounds. Thus the desired piperazine ring can be obtained by starting from a compound of Formula II, in which $R_1$, $R_3$ and P have the meaning indicated above and X represents halogen, by reaction with an amine $R_2NH_2$, in which $R_2$ has the meaning indicated. The methods of preparation mentioned hereinafter are to be preferred, however.

Starting from a compound of Formula III a 5-keto- and 5,6-diketo-piperazine can be obtained by reaction with a compound of Formula IV, in which X represents halogen or an alkoxy group with 1–6 carbon atoms and Z two hydrogen atoms or an oxygen atom.

By converting a compound of Formula III with a 1,2-dihalo-ethane the desired piperazine ring can be obtained directly.

Further 3-keto-piperazines can be prepared by reacting a compound of Formula V, in which $R_1$ and P have the meaning indicated above and R represents an alkyl group with 1-6 C-atoms, which the compound halCH$_2$—CN, in which hal represent a halogen atoms, followed by catalytic hydrogenation of the resulting nitrile and finally by cyclisation of the resulting amine by intramolecular aminolysis.

By using a diamine of Formula III the 6-ketopiperazines can be obtained in a simple manner by building up the piperazine ring at the ring nitrogen atom while blocking the amino group of the side chain. For this purpose the diamine (Formula III), in which $R_1$, $R_3$ and P have the meaning indicated above and $R_2$ represents hydrogen, is, for instance, reacted with chloroformic acid benzylester in an organic base; next the resulting product is coupled with halogen acetic acid halide, after which the benzyloxycarbonyl group is split off by catalytic reduction and the piperazine ring in the resulting product is finally closed, whether under the influence of a base or not.

A very good method of preparation of the 3,6-diketo-piperazine according to the invention consists in the conversion of a compound of Formula V with the compound halCH$_2$—COhal, in which hal represents a halogen atom, followed by the reaction of the resulting condensation product with the amine $R_2NH_2$.

It is also possible to react a compound of Formula V with the compound halCH$_2$—COOR and to convert the resulting diester with the amine $R_2NH_2$ to form the 3,5-diketo-piperazine.

The 6-keto-piperazine can, for instance, also be prepared by converting a compound of Formula VI, in which X represents halogen with the compound halCH$_2$—COhal, in a basic medium, followed by condensation of the dihalide formed with the compound $R_2NH_2$.

The intermediate product of Formula II, in which X represents halogen, which yields the desired final products by condensation with the amine $R_2NH_2$, can be prepared from a compound of Formula VII by reduction of the ester group to the corresponding alcohol group and halogenation of the diol with, for example, thionylchloride.

Grouping $R_2$, see Formula I, can be introduced during or after the synthesis by substitution of the hydrogen at the nitrogen atom in position 4 of the piperazine ring. The heterocyclic N containing ring with which a lower alkyl group ($R_2$) may be substituted by, for instance, the pyridine, imidazol, pyrazidine, pyrimidine, pyrazine, morphine, pyrrol or pyrrolidine ring.

Finally the present compounds can be prepared by reacting a compound of Formula VI, in which X represents halogen and $R_1$, $R_3$ and P have the meaning indicated above, with halCOCH$_2$hal, in which hal represents halogens. The thus formed halogen-acetyl derivative is then converted with RNH$_2$ into the 6-keto-piperazine derivative.

The new compounds may be applied as drugs, for example in the form of pharmaceutical preparations. For that purpose they are mixed with one or more pharmaceutical vehicles suitable for oral administration, or with liquid or solid auxiliaries, such as water, benzyl-alcohol, propylene glycol, polyalkylene glycols, vegetable oils, gelatin, starch, lactose and magnesium stearate. The preparations may be shaped into tablets, coated tablets, grains, pills or capsules, or they may occur in liquid form, such as solutions, emulsions or suspensions. Furthermore they may be used in the form of suppositories. They may also contain the required auxiliaries, such as fillers, lubricants, preservatives and emulsifying agents, and are prepared by any method known per se. Per dosage unit they contain for example 2–200 m. grams of the active substance dependent upon the way in which they are to be administered, as well as the nature and the degree of the biological activity. Thus, for example, the daily dosage may vary from 4 to 800 m. grams.

The compounds may also be applied for external use by introducing them into a spray together with a suitable propellant and, if desired, a solvent, further as a fine powder together with a suitable filler, and as a cream in combination with known auxiliaries.

The compounds according to the invention may be isolated and applied in the form of their acid addition salts the therapeutically acceptable acids, such as the inorganic acids, hydrochloric acid, sulphuric acid, hydrobromic acid and phosphoric acid, and organic acids, such as acetic acid, propionic acid, and substitution products, such as cyclohexyl propionic acid and phenyl propionic acid, tartaric acid, malic acid, citric acid, ascorbic acid, gluconic acid, mandelic acid, lactic acid, benzoic acid fumaric acid, maleic acid, methane sulphonic acid, ethane sulphonic acid, succinic acid, aspartic acid, glutamic acid and sulfamic acid.

Particularly the following substances show a high activity: 3(N) - methyl - 2,3,4,4a-tetrahydro-1H-pyrazino-[1,2-f] phenanthridine, the corresponding substances having a lower alkoxy group in 10-position, 3(N)-methyl-2,3,4,4a-tetrahydro - tetrahydro - 1H - pyrazino-[1,2-f]-morphanthridine, 6 - aminomethyl - 5,6 - dihydro-dibenzo-(b,f)-azocine and their acid addition salts.

DESCRIPTION OF THE PREFERRED EMBODIMENTS

Further details of our process are to be found in the following examples which are to be regarded as illustrative and not as limiting.

Example I.—Preparation of 3-methyl-1,2,3,4a-tetrahydro-1H-pyrazino-(1,2-f)-phenanthridine (a) 120 gm. of methylaminomethyl - phenanthridine of M.P. 130–134° C. are suspended in 1700 ml. of a 12% solution of methylamine in benzene and stored in a refrigerator for 18 hours. This solution is stirred now and again. Next the benezene solution is washed twice with 100 ml. of water, dried and freed from its solvent at reduced pressure to obtain 107 gm. of an oil which according to the sheet chromatogram is homogeneous.

(b) 6 - methylaminomethyl - 5,6 - dihydro - phenanthridine.—107 gm. of the compound prepared above are dissolved in 750 ml. of anhydrous ether and added, while stirring, to a paste of 50 gm. of LiAlH$_4$ in 250 ml. of anhydrous ether, in nitrogen atmosphere. After completion of the addition the mixture is refluxed for 1.5 hours, after which it is cooled down in ice and hydrolysed with 200 ml. of water. Next the ethereal solution is filtered over sodium sulphate and freed from ether by evaporation at reduced pressure. A light precipitate is formed which is removed by filtration. The ether is distilled off to obtain 90 gm. of an oil, which is used directly for the next conversion.

(c) 1,2 - diketo - 3 - methyl - 2,3,4,4a-tetrahydro-1H-pyrazino-(1,2-f)-phenanthridine.—65 gm. of the oil prepared under (b) and 50 ml. of ethyloxalate are heated in half an hour from 100 to 160° C., and next in half an hour from 160 to 180° C., during which process 25 ml. of ethanol are caught. After cooling down a gummy mass is obtained, which crystallises by triturating it with 100 ml. of benzene to obtain 33.1 gm. of the diketo compound of M.P. 220–225° C. After recrystallising from dimethylformamide-toluene the melting point is 227–229° C·

(d) 20.8 gm. of the compound prepared under (c) are suspended in 500 ml. of anhydrous tetrahydrofuran and stirred vigorously. Next a dry current of nitrogen is led through this solution with diboran. The temperature of the mixture rises a little, while the starting product disappears and a light precipitate is formed. After completion of the reaction the mixture is refluxed for 1 hour. Next alcohol is added to the cooled solution till no more gas develops and the precipitate has disappeared. The solvents are removed by evaporation and the residue is treated with 150 ml. of 6 N hydrochloric acid solution while heating it a little. After filtration the solution is cooled down and made alkaline with a 6 N soda solution. The resulting oil is extracted with ether, the organic layer washed with a saturated solution of sodium chloride in water, dried and freed from ether. The final product, 3 - methyl - 2,3,4,4a - tetrahydro - 1H - pyrazino-(1,2-f)-phenanthridine, is converted into the monohydrochloride, which after crystallisation from methanol-ether melts at 235–240° C., with decomposition. Yield 16.6 gm.

In the same manner the 3-methyl-10-methoxy-piperazinophenanthridine is prepared starting from 2-methoxy-6-methyl-amino-methyl-phenanthridine, the maleate of which melts at 165–170° C. (decomposition).

Example II

By the method described in Example I the double bond is reduced in 5–6 position starting from 2-bromo-6-methyl-aminomethyl-phenanthridine, after which by heating with ethyl oxalate the 1,2-diketo-3-methyl-10-bromo-2,3,4,4a-tetrahydro-1H-pyrazino - (1,2-f) - phenanthridine is formed of M.P. 251–253° C., which after reduction with NaBH$_4$ yields the corresponding 3-methyl-10-bromo-piperazino - phenanthridine - hydrochloride of M.P. 244–245° C. (decomposition). The maleate melts at 195–196° C.

In the same manner the 3-methyl-10-chloro-piperazino-phenanthridine-monohydrochloride is prepared starting from 2-chloro-6-methyl-aminomethyl-phenanthridine of melting point 210° C. (decomposition).

Example III

In the same manner as described in Example I the 1,2-diketo - 2,3,4,4a - tetrahydro - 1H-pyrazino-(1,2-f)-phenanthridine is prepared of M.P. 265–270° C. This product is converted into the piperazino-(1,2-f)-phenanthridine by reduction with LiAlH$_4$.

Example IV (a) Ten grams of 6 - aminomethyl-5,6-dihydro-phenanthridine are dissolved in 200 ml. of absolute benzene, to which are added 4.2 ml. of absolute pyridine, after which the mixture is cooled down to 5–10° C. Next 8.3 ml. of a solution of chloroformic acid-benzylester in 10 ml. of benzene are added to the solution dropwise in 20 minutes. Next the mixture is stirred for 15 minutes at 10° C. and after that for 45 minutes at room temperature. After that 200 ml. of water and 100 ml. of benzene are added and the mixture is shaken vigorously. It divides into 2 layers. The water layer is removed. The benzene layer is washed with 1 N hydrochloric acid solution and next with water until neutral reaction of the wash water. Next the benzene solution is dried and evaporated. The product obtained (14.5 gm.) is oily and suitable for further conversion.

(b) To a solution of 14.5 gm. of the 6-(N-benzyloxycarbonyl)-aminomethyl-5,6-dihydrophenanthridine in 100 ml. of benzene is added an equimolecular quantity of pyridine. To this solution is added dropwise, while stirring, at 10–15° C., chloroacetylchloride in an excess of 25%. Next the mixture is stirred for half an hour at room temperature and after that for half an hour at 50° C. Next water is added, whereupon the mixture is shaken and the separated benzene layer washed with water. After drying and evaporation a product is finally obtained which is recrystallised from methanol. Yield 85%.

(c) The 5-chloroacetyl - 6 - (N - benzyloxycarbonyl)-aminomethyl-5,6-dihydrophenanthridine obtained under (b) is dissolved in ethanol and stirred with palladium-carbon, during which process hydrogen is led through the mixture for 1 hour. After filtration and evaporation the product obtained with the free NH$_2$ group is converted directly into the corresponding 6-keto-piperazine after the addition of pyridine at 40–60° C., which is reduced in a known manner to the 2,3,4,4a-tetrahydro-1H-(1,2-f)-pyrazino-phenanthridine. The maleate thereof has a melting point of 185–190° C.

Example V (a) Twenty-five gm. of 2-benzylaniline dissolved in 150 ml. of benzene are cooled down in an ice bath to 8° C. To this solution are added 15 ml. of pyridine and after that a solution of 15 ml. of chloroacetyl chloride in 25 ml. of benzene, maintaining the temperature of the reaction mixture at 10–15° C. After stirring for 1 hour at room temperature 25 ml. of water are added and the mixture is shaken for 30 minutes. Next the mixture is sucked off and the benzene layer separated. Then the benzene layer is washed successively with 2 N HCl, a sodium carbonate solution and water. The extract dried on sodium sulphate is evaporated and the residue crystallised together with the crystals obtained already from benzene. Yield 18 gm.; M.P. 130–133° C.

(b) Forty gm. of N-chloroacetyl-2-benzylaniline are heated for 2 hours at 120° C. together with 50 ml. of phosphoroxy-chloride and 320 gm. of polyphosphoric acid. Next the reaction mixture is poured on ice and extracted with benzene. The extract is washed and dried on sodium sulphate and the benzene distilled off. The product obtained (31 gm.) yields after recrystallisation 24 gm. of 6-chloromethyl-morphanthridine of M.P. 136–137° C.

(c) Ten grams of 6-chloromethyl-morphanthridine are passed into 150 ml. of a solution of methylamine in benzene (10%). After storage of the solution for 20 hours at 0–5° C. the methylamine hydrochloride formed is sucked off and the filtrate evaporated to dryness. There remains as residue 11 gm. of crude 6-methylaminomethyl-morphanthridine.

(d) Eleven grams of crude 6 - methylaminomethyl-morphanthridine are dissolved in 50 ml. of absolute ether. While cooling in ice 2.7 gm. of lithium aluminiumhydride, dissolved in 100 ml. of absolute ether, are added. After boiling for 1 hour and cooling down in ice 11 ml. of water are added slowly dropwise while stirring. After stirring for another 30 minutes at room temperature the mixture is sucked off and the filtrate evaporated to obtain 11 gm. of crude 5,6-dihydro-6-methylaminomethyl-morphanthridine in the form of a light yellow oil.

(e) Ten grams of 5,6-dihydro-6-methylaminomethyl-morphanthridine are heated slowly, in 30 minutes, from 100 to 160° C. with 7 gm. of pure diethyloxalate and after that from 160–180° C. in 45 minutes. After cooling down the reaction mixture is stirred with benzene. The crystals are sucked off and yield after crystallisation from dimethylformamide 9 gm. of 1,2-diketo-3(N)-methyl-2,3,4,4a - tetrahydro - 1H - pyrazino - [1,2-f] - morphanthrodine of M.P. 245–247° C.

(f) Nine grams of the diketo-pyrazino-morphanthridine compound obtained above are reduced with diboran by the method described in Example I(d) to obtain a thick oily compound, which with hydrochloric acid yields the mono-hydrochloride of M.P. 256–266° C. with decomposition. The maleate melts at 192–195° C.

By converting 6-chloromethyl-morphanthridine with n-propylamine in accordance with (c) of this example, followed by reduction of the double bond between the carbon atoms 5 and 6, and conversion of the product formed with diethyloxalate the 1,2-diketo-3(N)-propyl-2,3,4,4a - tetrahydro - 1H - pyrazino - [1,2 - f] - morphanthridine is formed of melting point 196–199° C. By reducing the latter product with diboran an oily compound is obtained which yields the monohydrochloride of melting point 250–252° C.

Example VI (a) Ten grams of 5H-dibenzo[a,d]-cycloheptenon-5-oxim F. Sowinski and H. L. Yale Arzneimittel-Forschung 14, 117 (1964) are passed into 30 ml. of benzene together with 5 ml. of thionylchloride. The mixture is refluxed for 16 hours. The clear liquid obtained is evaporated to dryness in vacuo, incorporated in benzene (dry) and again evaporated to dryness. The latter process is repeated till all the thionylchloride remains and hydrochloric acid have disappeared to obtain 10.5 gm. of 6-chloro-dibenzo-(b,f)-azocine. The product is converted into the nitrile without further purification.

(b) Ten grams of 6-chloro-dibenzo-(b,f)-azocine are dissolved in 100 ml. of dry dimethylformamide, after which 5 gm. of sodium cyanide are added. The mixture is refluxed for 30 minutes. After cooling down it is poured on ice and the crude nitrile sucked off. After crystallisation from methanol the substance melts at 135–136° C. Yield 6.2 gm. of 6-cyano-dibenzo-(b,f)-azocine.

(c) Six grams of 6-cyano-dibenzo-(b,f)-azocine are dissolved in 80 ml. of dry tetrahydrofuran. While stirring this solution is added dropwise to a suspension of 13 gm. of lithium aluminiumhydride in 300 ml. of dry tetahydrofuran in nitrogen atmosphere. Next the mixture is refluxed for 16 hours, whereupon, after cooling down in ice, 50 ml. of water are added dropwise, while stirring.

After stirring for 1 hour at room temperature the mixture is sucked off and the filtrate evaporated to dryness in vacuo. Yield 6 gm. of 6-aminomethyl-5,6-dihydro-dibenzo-(b,f)-azocine in the form of a thick yellow oil.

(d) Six grams of 6-aminomethyl-5,6-dihydro-dibenzo-(b,f)-azocine are boiled for 2 hours in 50 ml. of dry formic acid methyl ester free from formic acid. The ester is distilled off to obtain 6.3 gm. of 6-formylamino-methyl-5,6-dihydro-dibenzo-(b,f)-azocine.

(e) Five grams of 6-formylaminomethyl-5,6-dihydro-dibenzo-(b,f)-azocine are reduced with lithium aluminiumhydride in tetrahydrofuran as described in Example VI(c) to 4, 8 gm. of 6-methyl-aminomethyl-5,6-dihydro-dibenzo-(b,f)-azocine of melting point 122–123° C. The product obtained is heated with 3, 6 ml. of diethyloxalate from 100 to 160° C. in 1 hour and from 160 to 180° C. in 30 minutes. After cooling down there remains a brown, tough mass, which crystallises after adding benzene. After sucking off, washing with benzene and drying 2.9 gm. of 1,2 - diketo-3(N)-methyl-2,3,4,4a-tetrahydro-1H-dibenzo-(c,g)-pyrazino-[1,2-a]-azocine are obtained of melting point 200–201° C.

(f) Ten grams of 1,2-diketo-3(N)-methyl-2,3,4,4a-tetrahydro-1H-dibenzo-(c,g)-pyrazino-[1,2-a] - azocine are boiled gently on a water bath for 15 hours together with 10 gm. of LiAlH$_4$ in 1000 ml. of ether. After cooling the mixture in ice 40 ml. of water are added slowly, dropwise, while stirring. After stirring the mixture for 30 minutes at room temperature it is sucked off and the filtrate evaporated. Then the 10 gm. of oil obtained are chromatographed over an SiO$_2$ column, from which the desired azocine is eluted with a mixture of methanol-ether (1:1). After treating the azocine with maleic acid in ethanol, and sucking off and drying the obtained product 6.6 gm. of 3(N)-methyl-2,3,4,4a-tetrahydro-1H-dibenzo-(c,g)-pyrazino-[1,2-a]-azocine monomaleate are obtained of melting point 164–165° C.

Three gm. of 3(N)-methyl-2,3,4,4a-tetrahydro-1H-dibenzo-(c,g)-pyrazino-[1,2-a]-azocine are reduced with diboran in tetrahydrofuran and isolated as described in Example I(d). The final product, 3(N)-methyl-2,3,4,4a,9,10 - hexahydro - 1H - dibenzo - (c,g)-pyrazino-[1,2-a]-azocine, is converted into the monohydrochloride, which does not yet melt at 270° C.

Example VII (a) By the method of Example V(b) N-chloroacetyl-2-phenyl-4-bromoaniline of M.P. 108–110° C. is converted into the 2-bromo-6-chloromethyl-phenanthridine of M.P. 186–188° C.

(b) Next the compound obtained is converted into the corresponding 2-bromo-6-methylaminomethyl-phenanthridine, an oily compound, by means of methylamine in accordance with Example V(c).

(c) The product prepared under (b) was reduced with LiAlH$_4$ and next reacted with diethyloxalate causing ring closure to the 1,2-diketo-3-methyl-2,3,4,4a-tetrahydro-1H-pyrazino-(1,2-f)-10-bromo-phenanthridine of M.P. 251–253° C.

(d) The diketone obtained was finally reduced with diboran to the 3-methyl-2,3,4,4a-tetrahydro-1H-pyrazino-(1,2-f)-10-bromo-phenanthridine, an oily substance, the hydrochloride of which melts at 240–250° C. (decomposition).

Example VIII

A pharmaceutical preparation suitable for injection is made by dissolving the following ingredients in water and sterilizing the obtained solution:

| | Mgm. |
|---|---|
| End product of Example I (melting point 235–240° C.) | 1 |
| Sodiumchloride | 8.5 |
| Methyloxybenzoate | 0.85 |
| Propyloxybenzoate | 0.15 |
| Distilled water to 1.0 ml. | |

This preparation is active against cardiovascular diseases.

Example IX

Five gm. of the monohydrochloride of the end-product of Example V (melting point 256–266° C.) and 1 gm. of chlorocresol are dissolved, while heating, in 100 gm. of water. Then a solution is made by melting together 12.5 gm. of spermaceti, 12 gm. of white wax and 56 gm. of liquid paraffin. Next the latter solution is added to the former and stirred until the mixture has cooled down.

Thus a pharmaceutical cream is obtained. It is used against various kinds of allergic troubles.

Example X

Twenty gm. of 6-methylamino-methyl-5,6-dihydro-dibenzo-(b,f)-azocine hydrochloride (Example VI(e)), 25 gm. of starch and 97 gm. of lactose are mixed. To the mixture is added, a solution of 2 gm. of gelatin in water, while kneading. The obtained mixture is granulated, dried, mixed with 1 gm. of magnesium stearate and 5 gm. of talcum- and pressed into tablets.

Said tablets are treated with a solution of shellac (1.5 mgm. per tablet) in ethanol, next dried and further treated with an aqueous solution of 3.5 mgm. of gelatin per tablet. Then the tablets are coated with talcum (3 mgm.) starch (5 mgm.) and sugar (280 mgm.). The coated tablets are polished with a mixture of white wax (0.02 mgm.) and carnauba wax (0.06 mgm. per tablet). These tablets may be used as antidepressive preparation.

What is claimed is:

1. A compound selected from the group consisting of a compound of the formula:

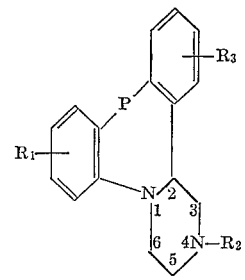

in which $R_1$ and $R_3$ are selected from the group consisting of hydrogen, halogen, acyloxy derived from an alkanoyl carboxylic acid having 1 to 6 carbon atoms, lower alkyl, lower alkoxy, and trifluoromethyl, $R_2$ is selected from the group consisting of hydrogen, lower alkyl, N-alkylaminoethyl and N-alkylaminopropyl, in which the N-alkyl group has 1 to 6 carbon atoms, and P is selected from the group consisting of a single bond, methylene, ethylene and ethenylene, and the pharmaceutically acceptable nontoxic acid addition salts thereof.

2. A compound selected from the group consisting of a compound of the formula:

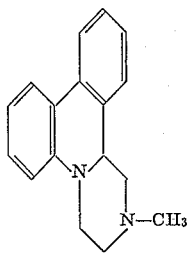

and the pharmaceutically acceptable nontoxic acid addition salts thereof.

3. A compound selected from the group consisting of a compound of the formula:

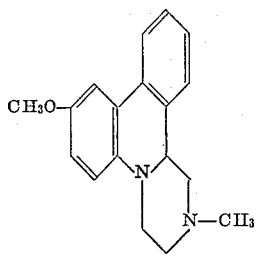

and the pharmaceutically acceptable nontoxic acid addition salts thereof.

4. A compound selected from the group consisting of a compound of the formula:

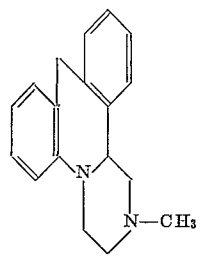

and the pharmaceutically acceptable nontoxic acid addition salts thereof.

References Cited

UNITED STATES PATENTS

| | | | |
|---|---|---|---|
| 3,004,975 | 10/1961 | Grob et al. | 260—268 X |
| 3,005,789 | 10/1961 | Bloom | 260—268 X |
| 3,151,116 | 4/1964 | de Stevens | 260—268 |
| 3,196,154 | 7/1965 | Steck | 260—268 |
| 3,317,524 | 5/1967 | Freed | 260—268 X |
| 3,328,396 | 6/1967 | Kirchner | 260—268 X |
| 3,388,128 | 6/1968 | Day | 260—268 |

OTHER REFERENCES

Schmitd et al.: Abstracted in Chem. Abstr., vol. 51, col. 10518d (1957).

DONALD G. DAUS, Primary Examiner

U.S. Cl. X.R.

260—288, 287, 285, 256.4, 239, 286, 544; 424—250